2,918,329
TIRE TRIM

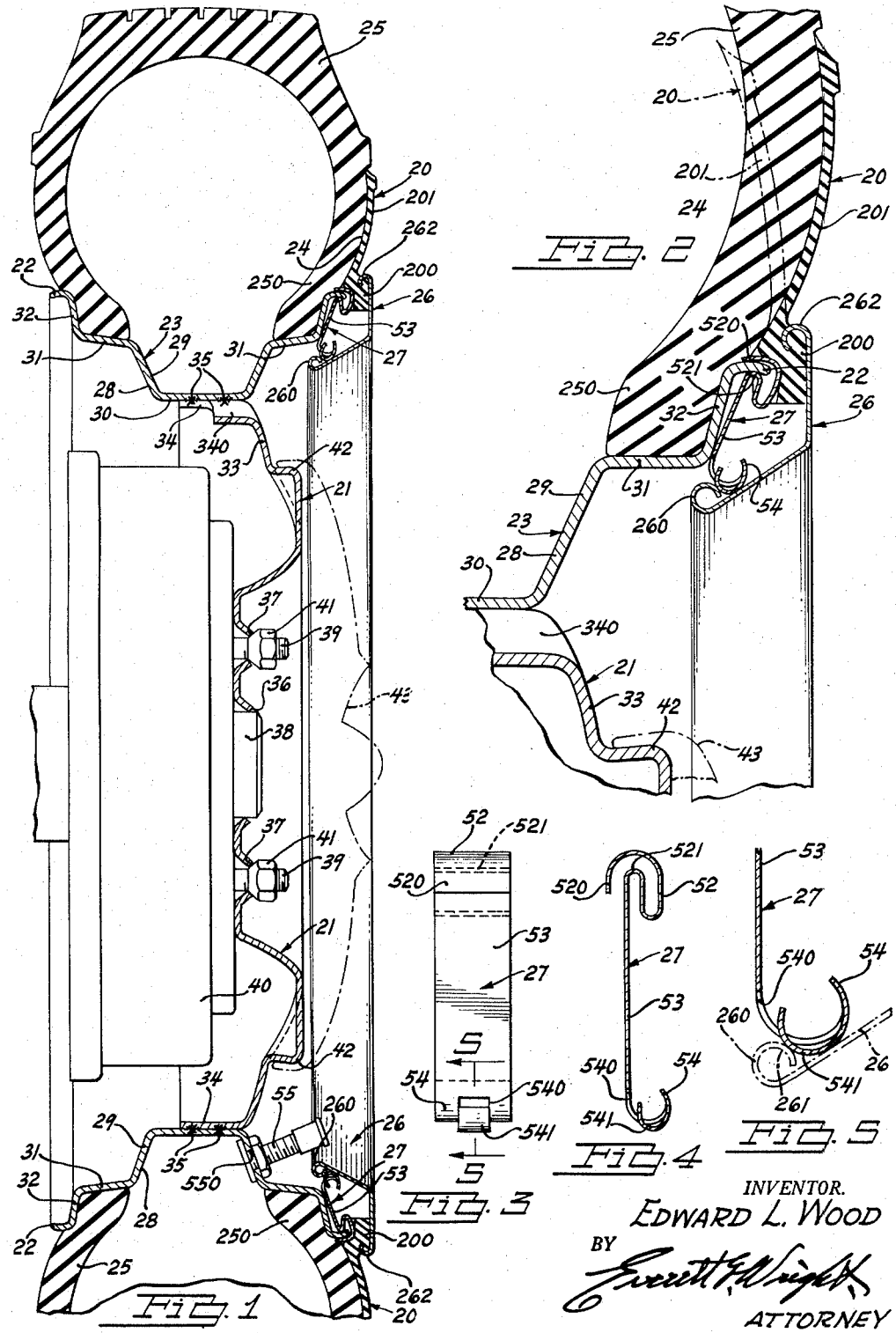
Dec. 22, 1959 — E. L. WOOD — 2,918,329
TIRE TRIM
Filed June 8, 1956 — 2 Sheets-Sheet 1
INVENTOR.
EDWARD L. WOOD
BY
ATTORNEY Dec. 22, 1959    E. L. WOOD    2,918,329
TIRE TRIM
Filed June 8, 1956    2 Sheets-Sheet 2
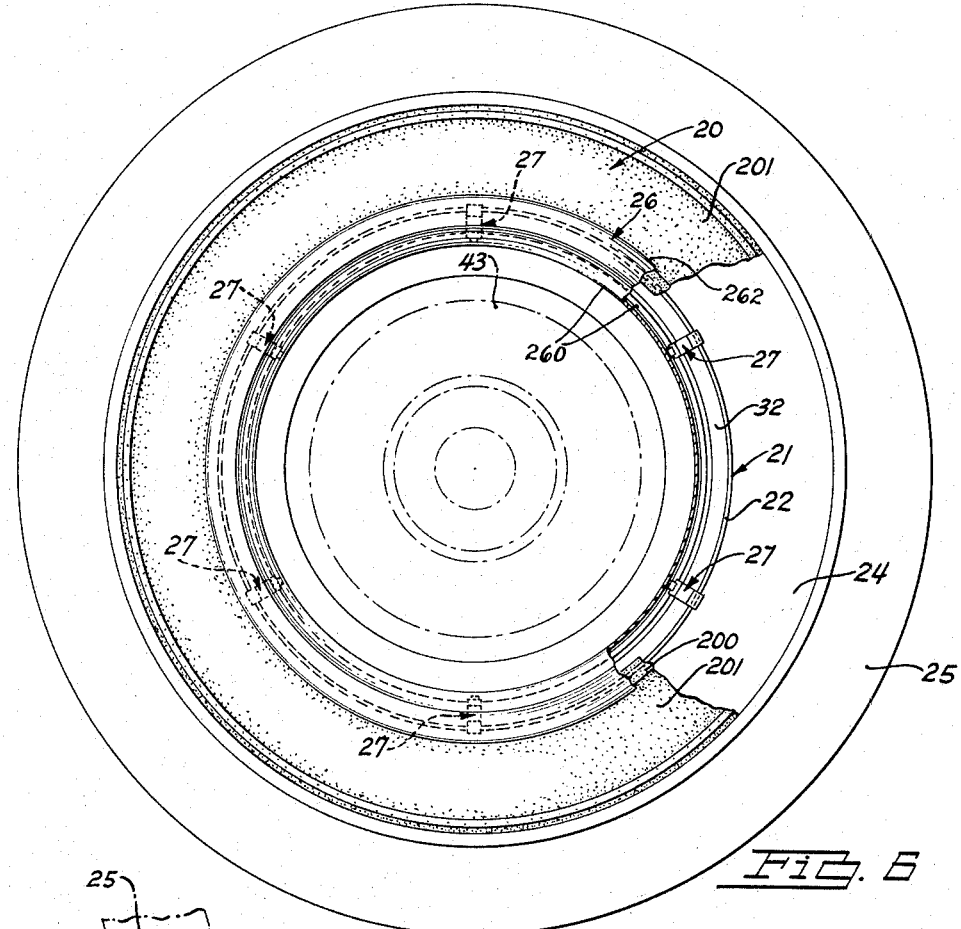
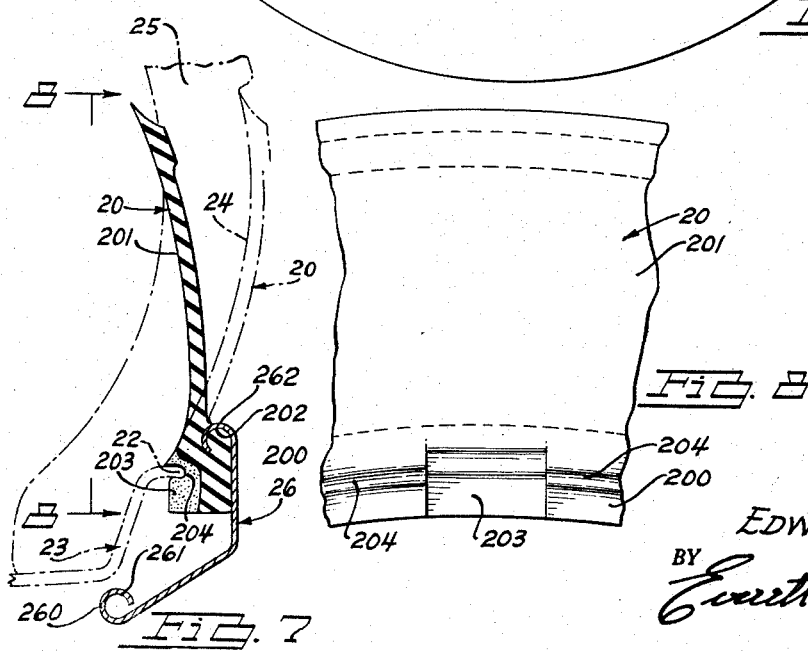
INVENTOR.
EDWARD L. WOOD
BY
Everett G. Wright
ATTORNEY

United States Patent Office 2,918,329
Patented Dec. 22, 1959

Edward L. Wood, Detroit, Mich., assignor, by mesne assignments, to Gar Wood Industries, Inc., a corporation of Michigan Application June 8, 1956, Serial No. 590,188

7 Claims. (Cl. 301—37)

This invention relates to improvements in tire trim, and in particular to means for trimming the walls of vehicle tires and means for securing such tire trim onto the vehicle wheel and against the wall of a tire mounted thereon.

The primary object of this invention is to provide a tire trim for vehicle tires including improved means for securing said tire trim onto a wheel on which the tire is mounted, said securing means holding the said tire trim concentrically onto the vehicle wheel and firmly against the wall of the tire.

Another object of the invention is to provide simple effective means for ornamenting or trimming the wall of a vehicle tire including a securing ring overlying the tire trim removably interlocking with clip means fixed onto the lip of the rim of the vehicle wheel.

A further object of the invention is to provide improved and effective clip means for removably attaching tire trim through the medium of an ornamental securing ring to vehicle wheels.

Other objects of the invention will become apparent by reference to the following detailed description taken in connection with the accompanying drawings, in which:

Fig. 1 is a vertical sectional view through a vehicle wheel and tire having improved tire trim means mounted concentrically thereon according to the instant invention.

Fig. 2 is an enlarged sectional view through the tire trim and its securing ring mounted by spring clips embodying the invention onto a vehicle wheel with the tire trim disposed firmly against the tire mounted on said vehicle wheel.

Figs. 3 and 4 are front and side elevational views respectively of improved spring clip means employed for removably securing the tire trim and its securing ring in axial concentric relationship onto the vehicle wheel.

Fig. 5 is an enlarged longitudinal sectional view through the inner end of the clip means taken on the line 5—5 of Fig. 3.

Fig. 6 is an elevational view of a vehicle wheel trimmed with tire trim in accordance with the invention, certain portions being broken away to better show the relationship of the several elements employed.

Fig. 7 is an enlarged sectional view through the tire trim and its securing ring, the tire trim assuming its preferred cross sectional contour as manufactured.

Fig. 8 is an enlarged fragmentary rear elevational view of the tire trim showing pockets formed in the inner bead thereof to accommodate the securing clips.

Referring now to the drawings wherein like numerals refer to like and corresponding parts throughout the several views, the particular construction disclosed for the purpose of illustrating the invention consists of a tire trim ring 20 of rubber or other resilient material formed preferably as shown in Fig. 7 having an inner bead portion 200 and an outer arcuately formed annular wall portion 201, and a securing ring 26 having its inner periphery suitably curled at 260 to provide an inner annular portion 261 which cooperates with clip means 27 as hereinafter described to removably fix the tire trim securing ring 26 and the tire trim 20 axially and concentrically onto the vehicle wheel 21. The full lines in Fig. 2 show the tire trim 20 secured onto the wheel 21 and over the side wall 24 of the tire 25, while the dot and dash lines therein show the contour of the annular wall portion 201 of the said tire trim 20 as molded. Fig. 7 shows the tire trim 20 in full lines as molded, the annular wall portion 201 thereof being shown in dot and dash lines as flexed against the wall 24 of the tire 25 when the said tire trim is properly positioned onto the securing ring 26 and over the lip 22 of the rim 23.

The securing ring 26 is suitably curled at its outer periphery at 262 to engage the inner bead portion 200 of the tire trim 20 as best shown in Figs. 1, 2 and 7, the said inner bead portion 200 of the tire trim 20 preferably having an annular groove 202 therein to receive the outer curled periphery 262 of the securing ring 26. The outer annular wall portion 201 of the tire trim 20 is formed to a greater cross sectional arcuate curvature than the curvature of the side wall 24 of the tire 25 mounted on the vehicle wheel 21 so that the said annular wall portion 201 will flex firmly against the tire wall 24 when the tire trim 20 is secured onto the vehicle wheel 21 by the securing ring 26 and clip means 27, see Figs. 1, 2 and 7. Suitable pockets 203 are preferably molded into the inner periphery of the annular bead portion 200 of the tire trim ring 20 at intervals therearound to accommodate the spring clip means 27 which removably fix the tire trim 20 onto the vehicle wheel 21 and over the wall 24 of the tire 25 through the medium of the securing ring 26. An inwardly facing annular groove 204 in the bead portion 200 of the tire trim ring 20 extending arcuately between the pockets 203 therein permits the said trim ring 20 to be located accurately over the lip 22 of the wheel rim 23.

The said securing ring 26 may be of any shape and size, and ribbed annularly to produce the desired ornamental effect and to cover the lip 22 of the wheel rim 23 and the bead portion 200 of the tire trim ring 20. Although it is generally customary to use stainless steel or chrome plated ornamental rings on vehicle wheels, and the securing ring 26 may be so finished, it is also contemplated that the securing ring 26 may be rubber dipped to provide a finish in the same or contrasting color of rubber as the tire trim ring 20, thereby providing the effect of an extremely large white wall or colored wall tire. If color other than white is employed, the color selected preferably would be aesthetically compatible with or contrasting to the color of the vehicle having its tires trimmed in accordance with the invention.

A typical vehicle wheel 21 of the type that may have tire trim embodying the invention applied thereto is shown in Figs. 1 and 6, the said wheel 21 being shown with a tubeless tire 25 thereon. The said vehicle wheel 21 has a drop center rim 23 composed of a central channel or drop center 28 having side walls 29 and a base 30. A tire bead seat 31 extends laterally outwardly from each of the channel side walls 29 and has a flange 32 extending upwardly therefrom which is curved at its upper portion to terminate in an axially disposed outer lip 22. Within the center of the drop center rim 23 is a spider 33 having an axially disposed flange 34 which generally is secured to the central channel 28 of the drop center rim 23 by such means as welding at 35. The spider 33 is provided with a hub aperture 36 and securing stud holes 37 to accommodate respectively the wheel hub 38 and studs 39 extending from the brake drum 40 to which the wheel 21 is secured by means of the usual wheel securing nuts 41. The flange 34 of the spider 33 is generally scalloped out and formed at 340 at intervals around the periphery thereof to provide added structural strength to the vehicle wheel 21. The spider 33 is preferably provided with a plurality of hub cap retainer nubs 42 over which a hub cap indicated by the dot and dash lines 43 is sprung for securement onto the vehicle wheel 21.

The spring clips 27 preferably employed to secure the tire trim ring 20 onto the vehicle wheel 21 through the medium of the securing ring 26 are formed of strip spring steel to provide a reversedly bent and looped rim engaging head 52 and a short preferably straight arm 53 having an outwardly curled securing ring engaging loop 54 at the radially inwardly disposed free end thereof as positioned on the rim 23 of a vehicle wheel 21. The spring clips 27, preferably five or six of them are sprung tightly onto the lip 22 of the flange 32 of the wheel rim 23 with the transverse edge of the free leg 520 of the looped head 52 thereof disposed in substantial abutment with the bead 250 of the tire 25 mounted on the drop center rim 23 in the manner required according to the type of tire used. When thusly fixed onto the lip 22 of the rim 23, the arm 53 of the spring clips 27 becomes firmly sprung against a portion of the wheel rim 23 radially and axially inwardly from the rim lip 22. The particular tire 25 illustrated is a modern tubeless tire. A valve stem 55 extends through the valve stem aperture 550 provided in the drop center rim channel 28. When the spring clips 27 are properly positioned on the lip 22 of the flange 32 of the wheel rim 23, the free leg 520 of the looped head 52 of the spring clips 27 and the inner reversedly bent portion 521 thereof grip opposite sides of the said lip 22 of the wheel rim flange 32 inwardly from the outer edge thereof.

The outwardly curled loop 54 at the free end of the spring clips 27 is of sufficient radius to permit local flexing, and is cut out at 540 and formed into a relatively narrow inwardly curled protruding tongue 541 over which the curled inner periphery 260 of the securing ring 26 snaps when the tire trim 20 is properly positioned over the lip 22 of the wheel rim 23 and the said securing ring 26 is axially pressed thereover. The inner annular portion 261 of the curled inner periphery of the securing ring 26 preferably abuts against the protruding tongue 541 of the looped end of the spring clips 27 as best shown in Fig. 5. It will be observed that the improved clip construction makes the tongue 541 and the curled loop 54 of the spring clips 27 more resilient than the remainder thereof, thus permitting the securing ring 26 and the tire trim 20 to be removed from the vehicle wheel 21 without removal of the said spring clips 27 from the lip 22 of the rim 23 thereof. By varying the relative size and formation of the curled loop 54, the width of the tongue 541 and the extent of the curl of the inner curled periphery 260 of the securing ring 26, the force required to snap the securing ring 26 in place on the vehicle wheel 21 and the resistance to the removal of the said securing ring 26 therefrom may be adjusted to meet all of the static and shock loading requirements for proper securement of the securing ring 26 and tire trim 20 to the vehicle wheel 21, and yet permit their removal therefrom without damage thereto. Although not shown, the tongue 541 may be omitted from the curled loop 54 of the spring clips 27, and the diameter of the said curled loop 54 changed, or it may be dimpled or otherwise deformed, to provide suitable engagement thereof by the inner curled periphery 260 of the securing ring 26.

Although but a single embodiment of the invention has been disclosed and described herein, it is obvious that many changes may be made in the size, shape, arrangement and detail of the various elements of the invention, all without departing from the spirit and scope thereof as defined by the appended claims.

I claim:

1. In combination with a vehicle wheel including a rim and a tire mounted thereon, means for trimming the tire of said vehicle wheel and said wheel rim comprising a resilient annular tire trim ring including an inner annular bead portion and an arcuately formed outer portion, clip means telescoped onto the lip of the wheel rim and sprung radially and axially inwardly against said wheel rim, said bead portion of said tire trim ring having an inner annular groove therein, and an ornamental securing ring interlocked with the bead portion of said wheel trim including a curled inner periphery sprung into engagement with said clip means removably fixing said tire trim and said ornamental securing ring as a unitary structure concentrically onto said vehicle wheel with the said tire trim telescoped annularly onto the lip of the wheel rim.

2. In combination with a vehicle wheel including a rim and a tire mounted thereon, means for trimming the tire of said vehicle wheel and said wheel rim comprising a resilient annular tire trim ring including an inner annular bead portion and an arcuately formed outer portion, clip means including a looped inner end telescoped onto the lip of the wheel rim and sprung radially and axially inwardly against the said wheel rim, said bead portion of said tire trim ring having an inner annular groove therein to permit said bead portion to be telescoped annularly onto the lip of the rim of said wheel, and an ornamental securing ring interlocked with the bead portion of said wheel trim including a curled inner periphery sprung into engagement with the looped inner end of said clip means removably fixing said tire trim and said ornamental securing ring as a unitary structure concentrically onto said vehicle wheel with the said tire trim telescoped annularly onto the lip of the wheel rim.

3. In combination with a vehicle wheel including a rim and a tire mounted thereon, means for trimming the tire of said vehicle wheel comprising a resilient annular tire trim ring including an inner annular bead portion and an arcuately formed outer portion adapted to flex firmly against the wall of the tire, clip means telescoped onto the lip of the wheel rim and sprung radially and axially inwardly against the said wheel rim, said bead portion of said tire trim ring having an inner annular groove and circumferentially spaced pockets therein to permit said bead portion to be telescoped annularly onto the lip of the rim of said wheel and over said spring clips, and a securing ring interlocked with the bead portion of said wheel trim forming a substantially unitary structure, said securing ring including a curled inner periphery sprung into engagement with said clip means removably fixing said unitary tire trim and securing ring structure concentrically onto said vehicle wheel with said bead portion of said tire trim telescoped onto the lip of the wheel ring.

4. In combination with a vehicle wheel including a rim and a tire mounted thereon, means for trimming the tire of said vehicle wheel comprising a resilient annular tire trim ring including an inner annular bead portion and an arcuately formed outer portion, clip means telescoped onto the lip of the wheel rim and sprung radially and axially inwardly against the side of said wheel rim, said bead portion of said tire trim ring having an inner annular groove and circumferentially spaced pockets therein to permit said bead portion to be telescoped annularly onto the lip of the rim of said wheel and over said spring clips, and a securing ring engaging the bead portion of said wheel trim sprung into engagement with said clip means removably fixing said tire trim onto said vehicle wheel and against a wall of said tire.

5. In combination with a vehicle wheel including a rim having an axially disposed lip and a tire mounted on said rim, means for trimming the tire on said wheel comprising a resilient annular tire trim ring including an inner annular bead portion and an outer arcuately formed wall portion adapted to flex against the wall of said tire when the inner annular bead portion is positioned over the lip of said wheel rim, spring clip means telescoped onto the lip of the wheel rim and sprung radially and axially inwardly against the side of said wheel rim, said spring clip means including a looped inner end, said bead portion of said tire trim ring having an inner annular groove and circumferentially spaced pockets therein to permit said bead portion to be telescoped annularly onto the lip of the rim of said wheel and over said spring clips, and a securing ring interlocked with the bead portion of said wheel trim having an inner curled periphery sprung into locking engagement with said looped inner end of said clip means removably fixing said tire trim onto said vehicle wheel.

6. In combination with a vehicle wheel including a rim having an axially disposed lip and a tire mounted on said rim, means for trimming the tire on said wheel comprising a resilient annular tire trim ring including an inner annular bead portion and an outer arcuately formed wall portion adapted to flex against the wall of said tire when the inner annular bead portion is positioned over the lip of said wheel rim, spring clip means telescoped onto the lip of the wheel rim and sprung radially and axially inwardly against the side of said wheel rim, said spring clip means including a looped inner end having a protruding tongue of greater resiliency than the remainder thereof, said bead portion of said tire trim ring having an inner annular groove and circumferentially spaced pockets therein to permit said bead portion to be telescoped annularly onto the lip of the rim of said wheel and over said spring clips, and a securing ring engaging the bead portion of said wheel trim sprung into engagement over said extending portion of said clip means removably fixing said tire trim onto said vehicle wheel.

7. In a construction of the class described, a vehicle including a wheel rim having an axially disposed annular lip, a tire trim ring including an annular bead disposed over the lip of said wheel rim, and an ornamental securing ring having a curled inner periphery, a plurality of clip means each including a looped head and an arm securable on the lip of said wheel rim with the free end of said clip arm disposed in abutment with a portion of said wheel rim axially and radially inwardly of the lip of said wheel rim, the outer periphery of said ornamental securing ring being larger in diameter than the lip of said wheel rim and the annular bead of said tire trim ring, the inner periphery of said ornamental securing ring being smaller in diameter than the lip of said wheel rim, and a resilient curled loop at the free end of said clip arms over which the curled inner periphery of said ornamental annular securing ring may be sprung whereupon the curled inner periphery of said ornamental annular securing ring becomes engaged on the looped ends of said clips and the said annular securing ring is urged axially inwardly and anchors the said tire trim ring onto said wheel rim with the bead thereof in engagement over the lip of the wheel rim.

References Cited in the file of this patent

UNITED STATES PATENTS

| | | |
|---|---|---|
| 2,351,655 | Aske | June 20, 1944 |
| 2,368,248 | Lyon | Jan. 30, 1945 |
| 2,455,151 | Wood | Nov. 30, 1948 |

FOREIGN PATENTS

| | | |
|---|---|---|
| 1,061,278 | France | Nov. 23, 1953 |